Figure 3:
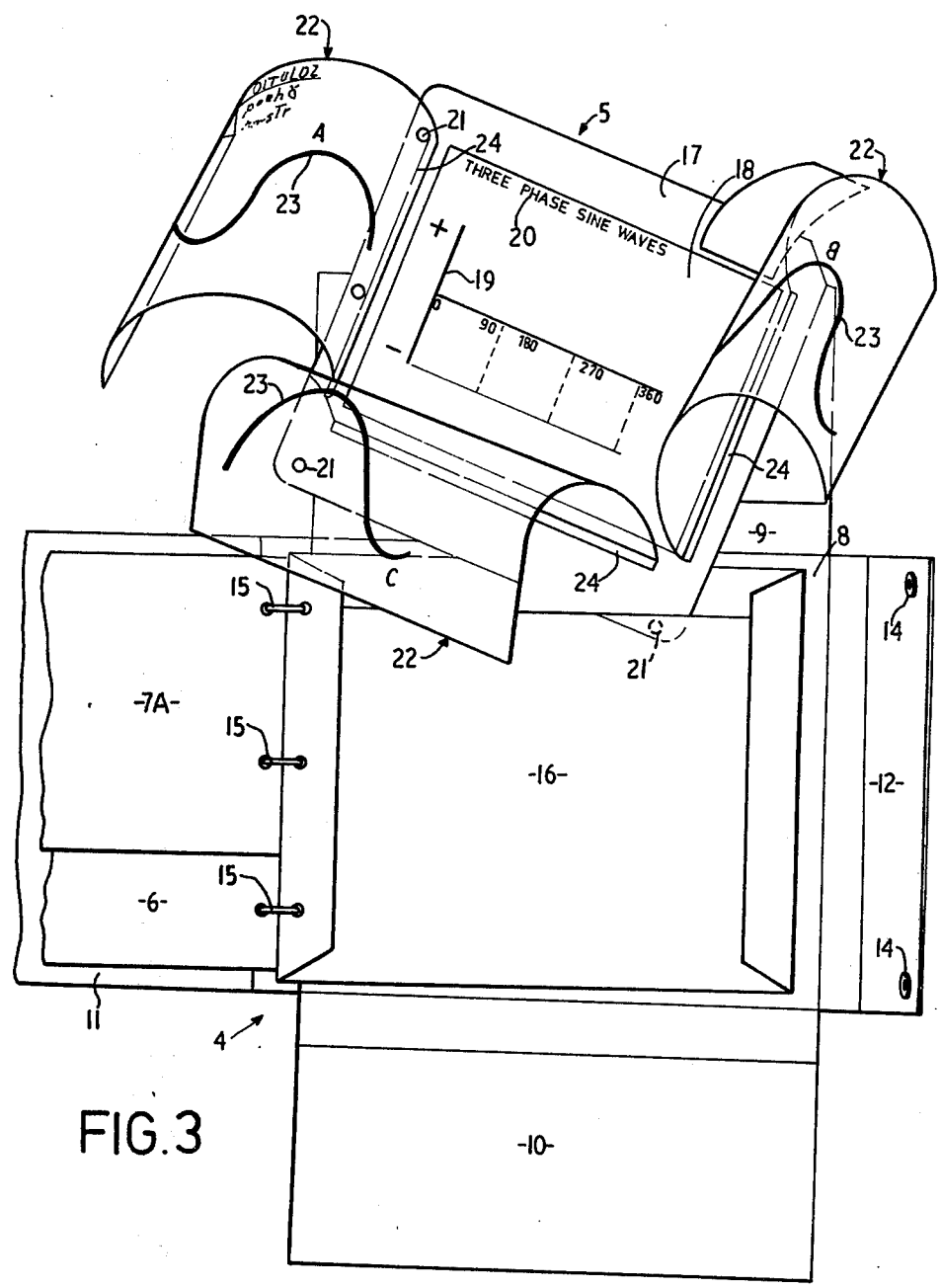

United States Patent [19]

Hayes

[11] 4,137,650
[45] Feb. 6, 1979

[54] TEACHING AID

[75] Inventor: Francis G. Hayes, Mosman, Australia

[73] Assignee: Clarendon Press Pty. Limited, Kensington, Australia

[21] Appl. No.: 785,472

[22] Filed: Apr. 7, 1977

[51] Int. Cl.$^2$ ............................................. G09B 1/12
[52] U.S. Cl. ...................................... 35/8 R; 40/533; 40/534; 281/16
[58] Field of Search ............... 35/8 R, 9 E, 13, 19 A, 35/35 E, DIG. 3; 40/102, 104.13, 104.14, 104.18, 106.1; 281/16, 33, 36; 353/44

[56] References Cited

U.S. PATENT DOCUMENTS

| | | | |
|---|---|---|---|
| 1,084,349 | 1/1914 | Krumming | 40/104.18 |
| 2,091,260 | 8/1937 | Farkas et al. | 40/104.18 |
| 2,229,012 | 1/1941 | Geyzer | 281/33 |
| 2,314,790 | 3/1943 | Jenter | 281/16 X |
| 2,515,278 | 7/1950 | Tucker | 35/13 |
| 2,579,915 | 12/1951 | Flatin et al. | 35/35 E UX |
| 3,104,273 | 9/1963 | Ballance | 35/8 R UX |
| 3,230,641 | 1/1966 | Sloves | 35/9 E |
| 3,253,358 | 5/1966 | Wright | 40/106.1 |
| 3,438,703 | 4/1969 | Winnemann | 40/106.1 X |
| 4,043,053 | 8/1977 | Kaye | 35/8 R |

Primary Examiner—William H. Grieb
Attorney, Agent, or Firm—Ladas, Parry, Von Gehr, Goldsmith & Deschamps

[57] ABSTRACT

A teaching aid providing text for a spoken commentary by a teacher and transparencies for simultaneous illustrative visual display, said aid comprising a loose-leaf binder of folded sheet material to form an enclosing case, means on adjacent folded flaps thereof to secure the case, loose-leaf binding means in the case, a stack of envelopes and an adjacent stack of text volumes mounted to said binding means, said volumes of text being arranged in a predetermined sequence, and a plurality of transparencies each removably accommodated within a respective one of said stack of envelopes and being arranged in said stack in the same sequence as said volumes of text.

9 Claims, 3 Drawing Figures

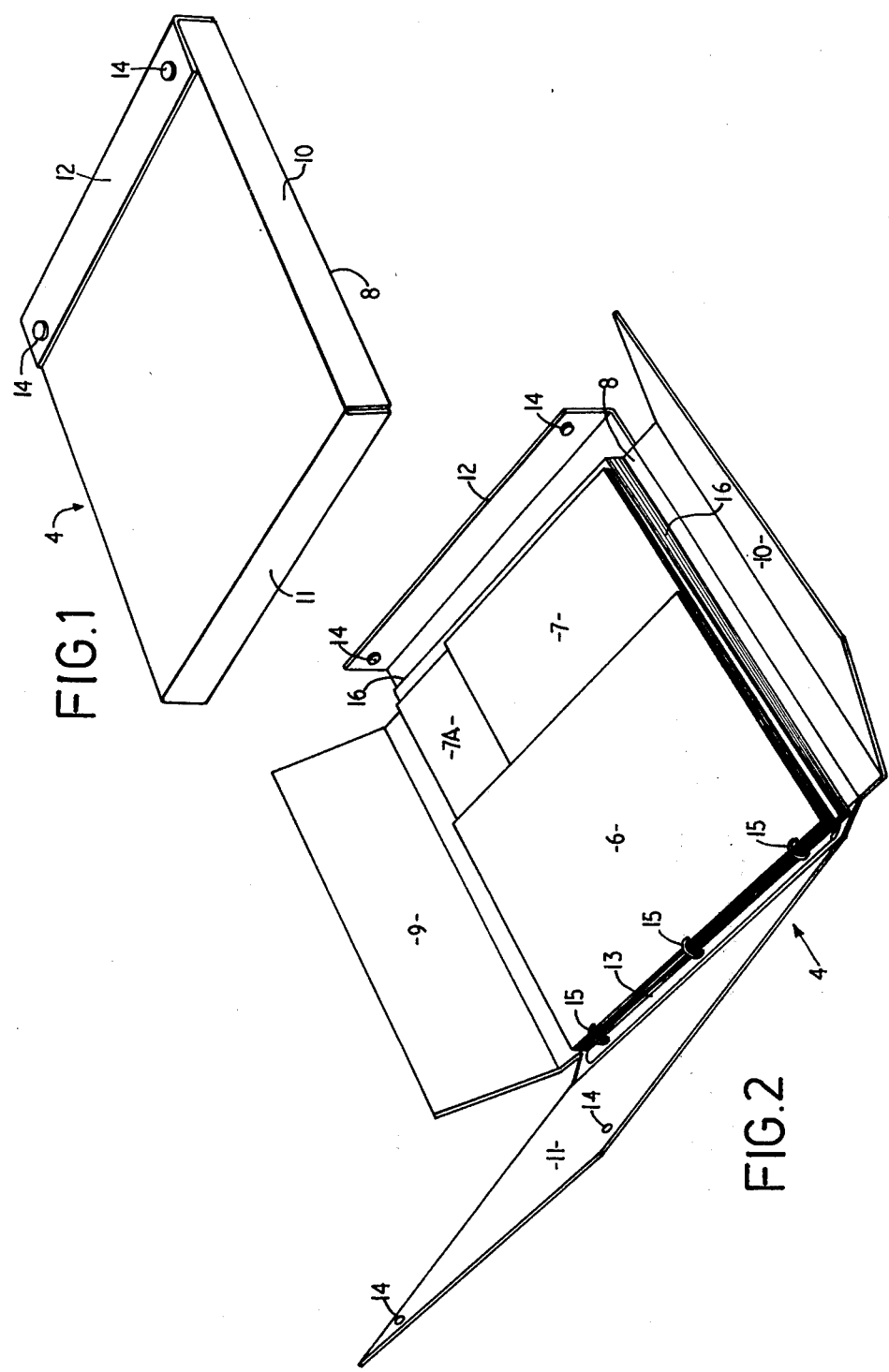

TEACHING AID

This invention relates to teaching aids, and more particularly aids of the kind which employ images projected on a viewing screen from prepared transparencies before a class while a commentary on the images is provided by a teacher.

It is the main object of this invention to provide in convenient form for the teacher the necessary transparencies and text which will enable a lecture in any specific subject to be performed.

In one general form of the invention there is provided an aid for teaching through the medium of images projected from prepared transparencies, comprising a loose-leaf binder of sheet material having a rectangular base and four lateral flaps foldable over the base to form a box-like container, cooperating means on a pair of opposite flaps for securing the binder in a closed condition, loose-leaf securing means attached to one flap within the binder, a stack of open-mouthed envelopes mounted upon the securing means, a plurality of said transparencies accommodated in a predetermined sequence within said envelopes, and one or more volumes of text also mounted in a stack upon the securing means either above or below the envelopes and providing information as to respective commentaries by a teacher to accompany projected transparencies.

The invention also provides in the above teaching aid a novel form of transparency which comprises a rectangular sheet having an opaque border surrounding a transparent panel containing printed images to be projected, and one or more overlays each hinged to a respective part of the opaque border so as to be removably positioned over the transparent panel with a printed image thereon accessory to the image on said panel.

A preferred embodiment of the invention is illustrated in the accompanying drawings, in which:

FIG. 1 is a perspective view of one form of the teaching aid of this invention in the closed position, FIG. 2 is a perspective view of the teaching aid in the open position, and FIG. 3 is a plan view of the opening teaching aid showing the text volumes folded away from the uppermost envelope, and a transparency partially removed from said envelope.

This invention will now be described with reference to the accompanying drawings in which it is assumed that a lecture is to be provided in the subject of "electric circuits". The classroom or lecture hall in which the lecture is to be given will be frequently provided with an overhead projector of conventional form in which a horizontally disposed projection gate, in the form of a flat rectangular sheet of glass, is provided upon which transparencies for projection are to be placed. By this invention the teacher is equipped with a closed binder 4 having mounted therein a plurality of envelopes 16 containing the group of transparencies 5 related to the subject and one or more volumes 6 and 7 and 7A of text upon which his commentary of individual projected images is to be based.

According to the invention this binder 4 is formed of sheet material, such as compressed cardboard in a selected colour and of a substance of not less than 800 grams/sq.m. The binder comprises a flat rectangular base 8 with flaps 9, 10, 11 and 12 extending laterally from each of its four sides. A spine 13 for the binder is provided on the inner end of a principal flap in one instance being the upper, and top, flap 11. The opposite, and bottom, flap 12 may be short with press studs 14 having cooperating parts on top and bottom flaps 11 and 12 whereby when the side flaps 9 and 10 are folded inwardly over the base 8 and the top 11 folded down thereupon and beneath the bottom flap 12 the press studs 14 will serve to secure the binder 4 in a closed condition to form a box-like container.

A loose-leaf securing means, such as a three-ring fastener 15, is secured to the inner face of the spine 13 and mounted thereon are a plurality of open-mouthed envelopes 16 above which one or more volumes of suitable printed text 6, 7 and 7A are also fastened. In a predetermined sequence within the envelopes 16 are removably accommodated a series of transparencies 5, whereby the teacher may withdraw from each envelope 16 in turn in the sequence the transparencies 5 for projection while reading from a respective portion of the printed text 6, 7 and 7A an appropriate commentary. When the lecture is completed all transparencies 5 will have been returned to the envelopes 16 whereby the binder 4 may again be closed and locked and returned to storage pending a further lecture in that respective subject.

In one form the transparencies 5 may consist of a base of polyester film printed on one side with an opaque, and desirably coloured, border 17 enclosing a rectangular transparent centre panel 18. A required image 19 is printed onto one side of this transparent panel 18 in one or more colours to reveal the title 20 of the work and other information. These bases are preferably die cut and punched as at 21 for attachment to a conventional overhead projector (not shown) as well as to the fastening means 15 of the binder 4. For the assumed lecture the images will frequently be schematic diagrams of electric circuits. As it will be desirable to pose certain problems to the class it is intended to add to projected images values and the text of problems. This is effected by providing overlays 22 printed in appropriate positions with the required text 23 and values (not shown), which are hinged at 24 to respective portions of the opaque border 17. It will, therefore, be possible to position a selected one, or more, of the overlays 22 upon the transparent centre panel 18 of the transparency 5 to effect projection of the additional information 23. Solutions to problems may also be projected by printing them in a different area 23A of an overly 22 with a flap 22A of opaque material removably positionable over said area 23A to prevent projection of the solution until desired, at which time the opaque flap 22A will be withdrawn. Should the opaque flap 22A be of appropriate colour it may be positioned over the centre panel 18 and beneath the overlay 22 containing the solution to enable that solution to be clearly read by the teacher viewing directly the transparency 5 while still preventing projection of such matter. When its projection is required the opaque flap 22A may be removed from beneath the overlay 22.

Whereas one embodiment has been described in the foregoing passages it should be understood that other forms within the scope of this invention are also possible.

What I claim is:

1. An aid for teaching through the medium of images projected from prepared transparencies, comprising a loose-leaf binder of sheet material having a rectangular base and four lateral flaps foldable over the base to form a box-like container, cooperating means on a pair of opposite flaps for securing the binder in a closed condition, loose-leaf securing means attached to one flap within the binder, a stack of open-mouthed envelopes mounted upon the securing means, a plurality of said transparencies accommodated in a predetermined sequence within said envelopes, and one or more volumes of text also mounted in a stack upon the securing means adjacent the envelopes and providing information as to respective commentaries by a teacher to accompany projected transparencies.

2. A teaching aid according to claim 1, wherein the stack of text volumes overlie the stack of envelopes and the open mouths of the envelopes all face the same way and away from the securing means.

3. A teaching aid according to claim 1, wherein the loose-leaf securing means is a multi-ring fastener.

4. A teaching aid according to claim 1, wherein at least one transparency comprises a rectangular sheet having an opaque border surrounding a transparent panel containing printed images to be projected, and one or more overlays each hinged to a respective part of the opaque border so as to be removably positioned over the transparent panel with a printed image thereon accessory to the images of said panel.

5. A teaching aid according to claim 4, wherein said transparency is die cut and punched for attachment to an overhead projector for projection of the images.

6. A teaching aid according to claim 4, wherein at least one of said overlays has information printed on a part of the transparent panel and an opaque flap is hinged to the overlay to conceal said part when said information is not to be projected.

7. A teaching aid according to claim 6, wherein said flap is hinged beneath the overlay during projection whereby said information is visible to the teacher but not projected until removed.

8. A teaching aid comprising a supply of transparencies for visual illustration of chapters of a subject and a plurality of volumes of an explanatory text of said subject, each said volume relating to an individual one of said transparencies, said teaching aid further comprising a loose-leaf binder of folded sheet material forming an enclosing case for said transparencies and said text volumes, loose-leaf binding means within said case mounting said text volumes in a stack and in a predetermined sequence, a stack of envelopes mounted on said binding means adjacent said stack of text volumes and containing for ready withdrawal said plurality of transparencies arranged in the same sequence as said stack of text volumes.

9. A teaching aid according to claim 8, wherein one of said transparencies comprises a rectangular sheet having an opaque border surrounding a transparent panel containing printed images to be projected, and one or more overlays each hinged to a respective part of the opaque border so as to be removably positioned over the transparent panel with a printed image thereon accessory to the image of said panel.

* * * * *